| United States Patent [19] | [11] Patent Number: 4,797,270 |
| Alvarado Cendan et al. | [45] Date of Patent: Jan. 10, 1989 |

[54] METHOD FOR THE OBTENTION OF AN ESPECIAL ALUMINA FROM THE POWDER PRODUCED IN METALLURGICAL ALUMINA CALCINATION

[75] Inventors: José M. Alvarado Cendan; Flor Campa Campa, both of Foz, Spain

[73] Assignee: Alumina Espanola S.A., Spain

[21] Appl. No.: 92,674

[22] Filed: Sep. 3, 1987

[30] Foreign Application Priority Data

Jul. 17, 1987 [ES] Spain .................................. 8702105

[51] Int. Cl.$^4$ .............................................. C01F 7/02
[52] U.S. Cl. ...................................... 423/625; 423/628; 423/630; 423/631; 423/DIG. 15; 241/25,27; 264/125
[58] Field of Search ................................ 423/625–628, 423/630, 631, DIG. 15; 264/125; 241/25, 27

[56] References Cited

U.S. PATENT DOCUMENTS

| 4,477,427 | 10/1984 | Matyasi et al. | 423/628 |
| 4,615,875 | 10/1986 | Gonczy et al. | 423/626 |
| 4,634,581 | 1/1987 | Cambridge et al. | 423/126 |

*Primary Examiner*—Stephen J. Lechert, Jr.
*Attorney, Agent, or Firm*—Ladas & Parry

[57] ABSTRACT

The process for the manufacture of special aluminas from the powder produced in the calcination of alumina hydrate, as proposed by the invention, achieves the recovery of this by-product, treating it separatedly from the rest of the alumina, in order to convert it into special alumina of high calcination degree, or alpha alumina, being adequate for uses other than aluminum production. The process is carried out by submitting the by-product to a water-washing stage that reduces its sodium content, solid and liquid separation, filtering and drying. A drying operation is finally carried out with a calcination at a high temperature wherein the alumina of high calcination degree is transformed into alpha alumina.

14 Claims, No Drawings

METHOD FOR THE OBTENTION OF AN ESPECIAL ALUMINA FROM THE POWDER PRODUCED IN METALLURGICAL ALUMINA CALCINATION

The present invention, refers to a method for obtaining a special alumina from the powder produced in metallurgical alumina calcination.

BACKGROUND OF THE INVENTION

It is known that alumina the industrial aluminum oxide ($Al_2O_3$), is obtained by heating at a high temperature (800°–1400° C.) the alumina trihydrate ($Al_2O_3.3H_2O$) produced in the Bayer process. By careful control and an accurate supervision of the manufacturing conditions, it is possible to obtain different varieties or types of alumina, depending on the calcination degree, chemical purity, particle size distribution and crystallographic characteristic thereof.

Depending on the calcination degree of the hydrate, the obtained products vary in water content and in crystallographic structure, resulting in different types of alumina according to the contents in alpha ($\alpha.Al_2O_3$ or corindon) or gamma ($\gamma.Al_2O_3$) forms or in other special transition states.

Special aluminas of high calcination degree are those which have a high content in alpha phase and they have uses other than the manufacture of aluminum.

It is known that metallurgical alumina is used for producing aluminum by electrolytic reduction.

The alumina trihydrate, due to its considerable water content, can not be used directly in electrolytic reduction tanks and must be submitted to a calcination stage before being used as anhydrous aluminum oxide or alumina ($Al_2O_3$) in the electrolytic tanks for aluminum production.

The Bayer process, as it is well known, involves the digestion of bauxite in a caustic medium under high pressure and at high temperature. The solved alumina is recovered from the resulting liquor by crystallizing it and precipitating it as trihydrate, which, after some steps such as classification, filtration and washing, is submitted to a calcination process in order to eliminate its water content before being used as metallurgical alumina for aluminum manufacture.

When this hydrate is calcined in conventional calcination installations, such as rotary or fluid-bed furnaces, a considerable amount of powder is produced due to the thermic and/or mechanical shock over the particles. These thin generated products must be retained inside the calcination system in order to prevent from atmospheric contamination and from the subsequent product losses. This is generally carried out by powder collecting mechanisms, such as electrostatic precipitators and the like, and the partially calcined alumina powder is commonly known as electrofiltre powder.

This recovered alumina powder is generally characterized by a particle size pattern, there being a higher rate of those having a size below 44 microns. Most frequently, the 90% by weight of alumina powder has a particle size below 44 microns. Additionally, the powder consists of mixture of calcined, partially calcined and non-calcined particles and, consequently, the water content thereof, determined by the fire loss assay (LOI) can vary between wide limits, for instance, between about 1 and 35% by weight. These properties of the alumina powder make it an inadequate by-product for the manufacture of aluminum and its removal creates serious problems, since its rate may reach sometimes a 5–10% with respect to the total amount of alumina yielded in the calcination. Thus, in case of an alumina calcination installation with a production capacity of 500,000 tons each year, the losses by alumina powder could reach the amount of 25–50,000 tons a year. So as to reduce this important loss of the by-product in certain calcination installations, a part of the generated alumina powder is mixed with the produced calcined alumina. The mixing, however, cannot eliminate the problem, since the calcined alumina always contains particles smaller than 44 microns and this content can not exceed certain acceptable limits, established as alumina specification by the operators of the reduction installations.

Due to this, only a relatively small part of the powder can be used, besides the problem of the particle size, the water content (LOI) of the powder also affects negatively the quality of the calcined alumina. Another method for reducing the gathered quantity of alumina powder consists of recycling the powder to the digestion stage, whereat it is resolved in the caustic medium so as to yield alumina trihydrate, which is recovered by crystallization and precipitation. This method, although it solves the problem of the effect of the powder on the quality of the produced alumina, is not economically satisfactory, since the powder redissolution implies the reprocessing thereof, the whole productivity of the plant being thus reduced in a direct relationship with respect to the amount of resolved alumina powder.

Other processes have been suggested for using the powder, either processed or directly, as seeding at the precipitation stage; for example of the U.S. Pat. Nos. 4,051,222 (Gnyra Sept. 27, 1977), 4,568,527 (Anjier and others, Feb. 4, 1986), etc. These alternatives may create some control problems for the precipitation process, increase the plant costs as the products are recycled through precipitation and calcination and, in any case they imply the introduction of alumina in the alumina hydrate crystallization circuit, thereby contaminating the produced hydrate. In plants of alumina production by the Bayer process, a part of the manufactured trihydrate, instead of being calcined in order to convert it in to metallurgical alumina, is often directly used as alumina trihydrate as raw material for uses other than aluminum manufacture. For these uses, the presence of anhydrous alumina in the trihydrate cannot be accepted.

Depending on the calcination degree, the sodium oxide ($Na_2O$) content of the starting hydrate and its graduation, different types of alumina are obtained with a higher or lower content in alpha phase ($\alpha.Al_2O_3$), as well as in other transition phases such as gamma, theta, etc. phases, and, in a lower amount in dependence of the sodium oxide being present, in beta phase ($11.Al_2O_3.1Na_2O$).

Further to its use as raw material for the production of aluminum and thanks to its interesting physical properties (high melting temperature, good dielectric characteristics, particularly high hardness, chemical inertia, etc.), alumina is nowadays an essential product in a great deal of industrial fields and for a wide range of uses. We may quote the manufacture of high temperature refractory products, industrial ceramic products and porcelains, enamels and special glass, abrasives, electrofluxes, etc.

The different types of special aluminas are mainly distinguished by their different calcination degree and, therefore, by their content in alpha alumina ($\alpha.Al_2O_3$), by their content in sodium oxide, by their purity in general and by their granulometric distribution and monocrystal size.

The calcined alumina, when coming out of furnaces, is formed by monocrystal aggregates, the diameter of which can vary depending on the granulometric characteristics of the starting hydrate. This alumina can be used such as it comes out of the furnace, or by separating the agglomerates into their elemental components by a grinding process. In this case, an extremely thin product is obtained, constituted by elemental crystals or monocrystals, so that almost all particles have a size below 44 microns.

The added value of the special alumina generally increases the more calcined it is (high content in alpha phase), the less sodium it has and the thinner it is.

Criteria for evaluation of the quality of an alumina as raw material for ceramic products are cited as for instance hereinafter:

Chemical purity: In this case the content in sodium oxide ($Na_2O$) plays a decisive role. It has been demonstrated that the mechanical and dielectric properties of ceramic oxides are improved as the beta alumina rate decreases. For high quality products, the content in sodium oxide ($Na_2O$) must not exceed the 0.1%; for less strict uses, the acceptable level stands between 0.2 and 0.3%.

Primary crystal size: Alumina individual particles consist of small crystal aggregates, "primary crystals". They generally size from 1 to 10 microns. These "primary crystals" must have a small size in order to assure a high sintering activity and, consequently, a high final density at relatively low treatment temperatures. A greater size of the primary crystals makes the compacting density increase and, therefore, the contraction decreases during the thermal treatment. By selecting the adequate alumina type, the behaviour during the thermal treatment can be modified depending on the type of manufacturer's technical installations.

Content in alpha ($\alpha.Al_2O_3$): The temperature, the residence time and the additive amount used in calcination determine the rate of the produced alpha variant (corindon). It is desirable to achieve more than a 90% (more than a 95% if possible) in order to minimize contraction during the thermal treatment.

Graduation: So as to obtain a complete sintering of the ceramic material even at temperatures below 1800° C., it is required that the alumina has the required size for the primary crystal. This usually achieved by a grinding process.

SUMMARY OF THE INVENTION

According to the invention, the alumina powder recovered from the collecting mechanisms of alumina hydrate calcination installations in the Bayer process, is treated separatedly from the rest of the alumina, in order to be transformed into high calcination degree special alumina, adequate for uses other than aluminum production (gamma structure).

The process according to the invention simultaneously solves the problem caused by the powder on the alumina quality for producing aluminum and a route is found for transforming it into special alumina of a high calcination degree, being adequate as raw material for different industrial uses.

DESCRIPTION OF THE INVENTION

The terms "powder", "partially calcined alumina powder", "alumina powder" or "electrofiltre powder", are used for referring to an alumina by-product at temperatures higher than 500° C. This pulverulent by-product is characterized additionally by having such a particle size distribution that those being smaller than 44 microns in size do not represent less than a 90% by weight of the total powder and that about a 85% by weight of the particles has a size below 20 microns. The terms "alumina hydrates", "alumina trihydrate" and "hydrate" such as they are used here, refer to an alumina of general formula $Al_2O_3.xH_2O$, wherein x varies from 1 to 3.

The terms "calcined" or "metallurgical" refer to the calcined alumina product having a graduation wherein at least a 85% by weight of the particles has a size higher than 44 microns and having a fire loss (LOI) lower than the 5% by weight.

As "calcination degree", we understand the extent of transformation reached by the alumina hydrate in furnaces. The calcination degree increases with calcination time and temperature. From the lowest calcination degree form (alumina trihydrate), as the calcination temperature and/or time are increased, a series of by-products, phases or intermediate forms are obtained. From a certain temperature there appears the alumina form known as alpha alumina ($\alpha.Al_2O_3$) or corindon, which is reached after going through stages of intermediate calcination degree.

The terms "special alumina" or "high calcination degree special alumina" refer in this description to an alumina with a similar graduation to that of electrofiltre powder, but with such a calcination degree that more than a 90% by weight is in the structural form known as alpha alumina.

The expression "low sodium content" refers to an alumina whose content in sodium is lower than a 0.30% by weight.

Taking the above into account, the special alumina manufacturing process from the powder produced in the calcination of alumina hydrate that constitutes the object of the invention consists of submitting the powder having been recovered by any powder collection conventional system, such as electrostatic precipitators, filtres, cyclones and the like, to a series of operations in order to transform it into a special alumina of high calcination degree, being adequate for different industrial uses.

According to this process, the alumina powder is water washed for reducing its sodium content, repulping it in a tank under stirring; after a decantation stage, it is filtered and washed and then fed to a drying and calcinating installation, wherein it is transformed into high calcination degree alumina (more than a 90% content in $\alpha.Al_2O_3$).

DETAILED EXAMPLE OF THE MANUFACTURING PROCESS

Laboratory assays having been performed in order to determine the feasibility of the industrial treatment for obtaining an alumina of high calcination degree and low content in sodium show that, starting from the by-product produced in the calcination of the hydrate on fluid bed, with an adequate treatment, a double effect is achieved, namely, improving the alumina quality and obtaining a product acceptable in the market.

Chemical, physical and crystallographic characteristics of the produced powder were daily tested. The following Table shows those differential properties with respect to calcined alumina that have a greater dispersion along the time, there being indicated in each one of them their dispersion:

| COMPOSITION | AVERAGE | DISPERSION |
|---|---|---|
| MEDIAN | 12.3 | 1.4 |
| <45μ (%) | 96.5 | 3.7 |
| <20μ (%) | 85.4 | 7.2 |
| $Na_2O$ (%) | 0.51 | 0.18 |
| $Fe_2O_3$ (%) | 0.023 | 0.013 |
| $V_2O_5$ (%) | 0.045 | 0.012 |
| $SiO_2$ (%) | 0.017 | 0.005 |
| S (%) | 0.47 | 0.12 |
| GIBBSITE (%) | 17.0 | 4.3 |
| SPEC. SUR. ($m^2/g$) | 46.3 | 26.4 |
| L.O.I. (%) | 15.2 | 2.7 |
| α-$Al_2O_3$ (%) | 11.34 | 2.85 |

In order to verify the amount of sodium of the product that can be removed in a water-washing, three powder samples were collected having a different sodium content and they were thoroughly washed with water. The following Table shows the sodium content of the initial product and of the washed product.

| PRODUCT | $Na_2O$ % | WASHING $Na_2O$ % |
|---|---|---|
| 1 | 0.35 | 0.13 |
| 2 | 1.10 | 0.12 |
| 3 | 1.47 | 0.25 |

Taking product 1 as base, assays were performed by repulping in four stages, thereby determining at each washing stage the residual sodium of the product.

The solid and the liquid were separated from each other at each stage by decantation. The obtained results are as follows:

| | WASHING REL. Water/Solid | $Na_2O$ % | WASHING REL. Water/Solid | $Na_2O$ % |
|---|---|---|---|---|
| INITIAL | — | 0.35 | — | 0.35 |
| FIRST STAGE | 5:1 | 0.17 | 2.5:1 | 0.17 |
| SECOND STAGE | 5:1 | 0.13 | 2.5:1 | 0.14 |
| THIRD STAGE | 5:1 | 0.13 | 2.5:1 | 0.13 |
| FOURTH STAGE | 5:1 | 0.13 | 2.5:1 | 0.13 |

The same test was repeated with sample 2 employing a wahing relationship of 5 to 1.

| | WASHING REL. Water/Solid | $Na_2O$ % |
|---|---|---|
| INITIAL | — | 1.10 |
| FIRST STAGE | 5:1 | 0.18 |
| SECOND STAGE | 5:1 | 0.15 |
| THIRD STAGE | 5:1 | 0.12 |
| FOURTH STAGE | 5:1 | 0.12 |

With sample 3, only a washing stage by repulping was carried out:

| | WASHING REL. Water/Solid | $Na_2O$ % |
|---|---|---|
| INITIAL | — | 1.47 |
| FIRST STAGE | 5:1 | 0.30 |

After the first washing stage, the sodium contained in the sample that can be lixiviated is:

| SAMPLE | $Na_2O$ % |
|---|---|
| 1 | 0.04 |
| 2 | 0.06 |
| 3 | 0.05 |

A three-staged water washing of a sample of some 20 Kg of electrofiltre powder was made.

At each washing stage, the solid was separated by decantation and removal of the supernatant liquid. After the third washing stage, the solid was vacuum-filtered and dried at 100° C.

The most complete analysis of the washed product is expressed hereinafter:

| | CHEMICAL ANALYSIS OF THE STARTING PRODUCT | ANALYSIS OF THE WASHED PRODUCT |
|---|---|---|
| $Ga_2O_3$ % | 0.015 | 0.12 |
| $Na_2O$ % | 0.35 | 0.13 |
| $Fe_2O_3$ % | 0.023 | 0.022 |
| $V_2O_5$ % | 0.024 | 0.023 |
| $TiO_2$ % | 0.002 | 0.002 |
| CaO % | 0.008 | 0.008 |
| ZnO % | 0.001 | 0.001 |
| $SiO_2$ % | 0.024 | 0.023 |
| L.O.I. % (1000° C.) | | 14.98 |
| Spec. Surface $m^2/g$ (B.E.T.) | | 47.8 |
| Gibbsite % (as $Al_2O_3$) | | 20.3 |
| <325 m (45μ) % | | 93.2 |
| Median (μ) | | 14.9 |

With the powder used at the previous stage, decantation assays were carried out in a test tube with a water to solid rate of 5 to 1. Solid compacting at the bottom along the time was determined, yielding the following results:

| | Solid % |
|---|---|
| Starting pulp | 17.7 |
| TIME (min) | Solid % BOTTOM |
| 15 | 31.5 |
| 30 | 46.1 |
| 60 | 56.5 |

Solids sedimentation is good and compacting acceptable.

Due to hydrolysis of the sulphur contained in the powder, washing water is acid. During decantation assays it was seen that within the pH interval 4.5–4.7 there is a powder deflocculation, for which it is impossible to achieve a normal sedimentation; at lower or higher pH values there is no problem at all.

This fact that is to be taken into account, does not represent any problem, since, by using process condensate as washing water, the pH obtained is not lower than 5.

Vacuum filtration tests were also conducted on the washed pulp with a solid concentration from 27 to 45%, using as model a rotatory drum filtre.

The obtained results, which we are not thoroughly showing in order not to increase unnecessarily this description, determined the amount of filtered pulp by surface unit, the thickness of the cake formed, the moisture thereof, as well as the conditions under which filtration was conducted, time, temperature, pressure, etc. and in the three washing tests carried out by diffusion in the filtre, wherein the feeding product was powder washed by repulping at one stage, at a 5:1 rate and deposited until solid compacting at the bottom of the 30%. A filtration was obtained in rotatory vacuum filtre being totally positive and washing by diffusion in the same filtre gave optimum results.

Calcination tests were conducted on the washed and dried product obtained in the previous tests. Calcination was performed in a laboratory furnace adjustable to 1480° C. between 1100° and 1400° C. The residence time of the samples in the furnace was 10 minutes in all cases.

Two series of calcination of the product were carried out, one of them using a 0.5% of $F_3Al$ as flux, in order to determine whether this one could reduce the temperature needed to produce a complete transformation into $\alpha.Al_2O_3$.

The obtained results, concerning the content in alpha phase of the product resulting from each calcination, showed that the samples containing $F_3Al$ had a complete transformation degree from 1115° C., whilst it was necessary to reach 1400° C. for obtaining the 100% of $\alpha.Al_2O_3$ in those samples that did not contain additive.

Grinding tests were initiated on the calcined sample, wholy transformed into $\alpha.Al_2O_3$, so as to check the ability to reduce the size of the obtained product.

The grinding was carried out under wet conditions in steatite cylindrical mill with alumina balls from 2 to 4 cm in diameter, for 24 hours. The graduation of the starting product and the ground ones is hereinafter expressed, indicating as "small balls" the grinding carried out with a higher proportion of 2 cm balls and as "big balls" that wherein those of 4 cm prevailed, as per the following Table.

|  | Starting Product | Small Balls | Big Balls |
| --- | --- | --- | --- |
| M ($\mu$) | 11.6 | 5.7 | 6.4 |
| $Q_1$ ($\mu$) | 14.8 | 7.6 | 8.4 |
| $Q_3$ ($\mu$) | 8.6 | 4.3 | 4.8 |
| % < 45 ($\mu$) | 99.4 | 99.9 | 99.8 |
| <30 | 98.0 | 99.6 | 99.0 |
| <20 | 93.0 | 98.6 | 97.8 |
| <10 | 35.5 | 90.3 | 87.0 |
| <5 | 19.0 | 38 | 27 |
| <3 | — | 8 | 4.8 |

In the laboratory tests, a product was obtained by washing and calcining the electrofiltre powder, the main characteristics of which could be summed up as follows:

| $Na_2O$ % | 0.1–0.2 |
| --- | --- |
| $\alpha$-$Al_2O_3$ % | 98–100 |
| SPECIFIC SURFACE $m^2/g$ | 1.7 |
| Real Density g/cc | 3.95–3.96 |
| % < 45$\mu$ | 95–99 |

The rest of the chemical characteristics can be deduced from the composition of the starting product, since they do not undergo a substantial variation, but a little adjustment due to the loss of water of the hydrate contained in the powder, which can involve a 10% increase in impurities.

We claim:

1. A method for obtaining special alumina from powder produced in the calcination of metallurgical alumina comprising
   (a) calcining metallurgical alumina
   (b) collecting said calcined alumina powder said powder being extremely thin and formed by a mixture of aluminas of different calcination degree, both mono and tri-hydrate and with a high sodium content,
   (c) washing the powder in water in order to reduce its sodium content, repulping it in a tank with stirring,
   (d) separating solid and liquid by decantation,
   (e) filtering, and washing in water,
   (f) calcining at a high temperature, whereby the powder is transformed into special alumina or corindon and
   (g) grinding the obtained product.

2. The method, as in claim 1 further comprising $F_3Al$ as a calcination additive.

3. The method, as in claim 1 wherein said powder comprises electrofiltre powder.

4. The method, as in claim 1 wherein said powder comprises a particle size distribution such that more than 90% by weight of the particles are smaller than 44 microns.

5. The method, as in claim 1 wherein about 85% by weight of the particles are less than 20 microns in size.

6. The method as in claim 1 wherein the special alumina comprises more than 90% alpha alumina.

7. The method, as in claim 1 wherein the high temperature in step (f) comprises a temperature between 1100°–1400° C.

8. A method for obtaining special alumina from powder produced in the calcination of metallurgical alumina consisting of:
   (a) calcining metallurgical alumina
   (b) collecting said calcined alumina powder said powder being extremely thin and formed by a mixture of aluminas of different calcination degree, both mono and tri-hydrate and with a high sodium content,
   (c) washing the powder in water in order to reduce its sodium content, repulping it in a tank with stirring,
   (d) separating solid and liquid by decantation,
   (e) filtering, and washing in water,
   (f) calcining at a high temperature, whereby the powder is transformed into special alumina or corindon, and
   (g) grinding the obtained product.

9. The method, as in claim 8 further comprising $F_3Al$ as a calcination additive.

10. The method, as in claim 8 wherein said powder comprises electrofiltre powder.

11. The method, as in claim 8 wherein said powder comprises a particle size distribution such that more than 90% by weight of the particles are smaller than 44 microns.

12. The method, as in claim 8 wherein about 85% by weight of the particles are less than 20 microns in size.

13. The method as in claim 8 wherein the special alumina comprises more than 90% alpha alumina.

14. The method, as in claim 8 wherein the high temperature in step (f) comprises a temperature between 1100°–1400° C.

* * * * *